Figure 1:
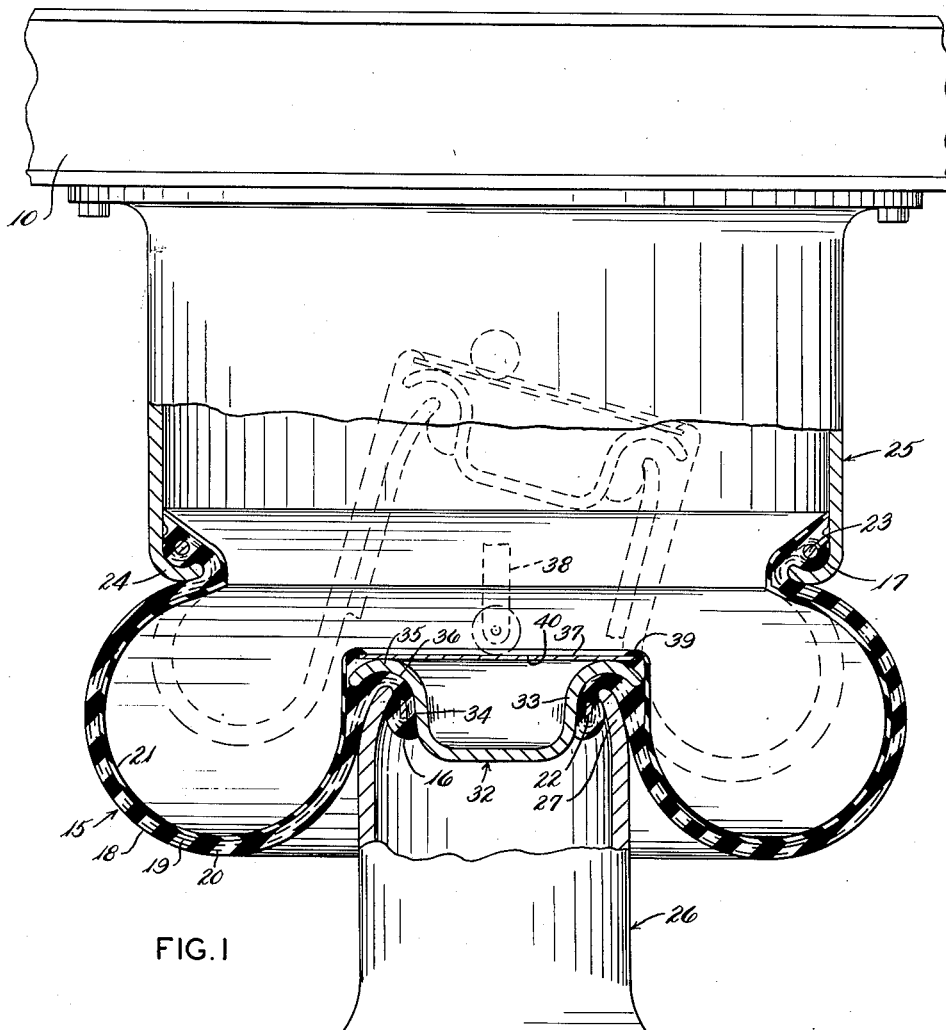

June 12, 1962  T. A. BANK  3,038,717
AIR SPRING
Filed Feb. 4, 1957

INVENTOR.
THOMAS A. BANK
BY W. A. Fraser
ATTY.

United States Patent Office 3,038,717
Patented June 12, 1962

3,038,717
AIR SPRING
Thomas A. Bank, Indianapolis, Ind., assignor to The Firestone Tire & Rubber Company, Akron, Ohio, a corporation of Ohio
Filed Feb. 4, 1957, Ser. No. 638,095
1 Claim. (Cl. 267—65)

This invention relates to air springs and more particularly to an improved air spring construction and to a method of mounting such air springs to a supporting structure.

Since air springs have been increasingly used as the resilient elements in automotive suspensions, it has been of greater importance to be able to mount air springs in their supporting structures in a manner which provides quick and easy assembly in the suspension and convenient removal and replacement when the air springs require service. This should be accomplished without sacrificing the performance or reducing the service life of the air springs. It is desirable moreover that the method of attachment should provide economies in material, production costs and labor.

All of the above requirements are met by the present invention which enables the type of air spring, known as the telescoping, single-convolution air spring, to be snapped into place on annular supporting members. Such telescoping air springs are characterized by a relatively large bead at one end, usually the top end, in service, and a beaded end of smaller diameter which telescopes through the large bead when the air spring is compressed. Specifically the present invention comprises a tubular supporting member having an inturned edge which cooperates with the small bead in such a manner that the forces of operation retain the parts in assembled position. Essentially the dimensions of the parts are such that the bead and inturned edge "snap" together and then tend to remain assembled by virtue of the compressive forces between the parts.

As an additional feature, the small beaded end is closed by a reinforcing member preferably in the form of a cup which has the added functions of facilitating molding, sealing off the small end of the air spring and lending mechanical strength to the small bead so that it can better cooperate with the supporting edge.

It is accordingly among the general objects of the invention to provide an improved air spring construction and an improved manner and means of mounting an air spring in a vehicle suspension.

More specifically, it is an object to provide an air spring which cooperates with and is supported by a "snap-in" pedestal which bears against and supports a reinforced end of the air spring.

A further object is to provide an air spring having a beaded end which is closed by an annular reinforcing member which facilitates the cooperation of the air spring with a supporting member.

Other objects are to provide a vehicle suspension and manner of mounting an air spring therein which enables quick and economical assembly and disassembly of the parts, which is effective and which gives a long service life, which gives good ride characteristics, and which utilizes the forces of operation to retain the parts in assembled position.

Figure 2:
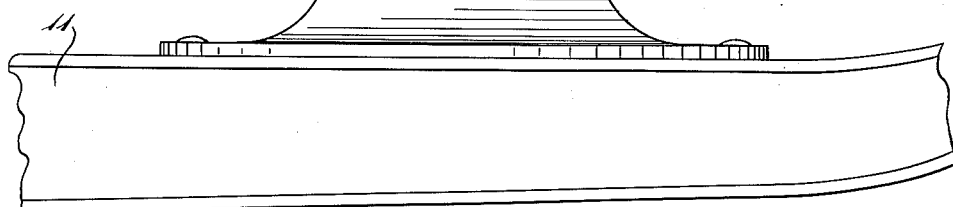

The above and further objects and advantages will be more fully apparent from the following description of a preferred form of the invention, reference being had to the accompanying drawing in which:

FIGURE 1 is a vertical view taken in a vertical plane and showing an air spring assembled in a vehicle suspension in a manner embodying the present invention, and FIGURE 2 shows an alternate form of an air spring construction.

While the invention will be described with reference to an air spring as it is used in an automobile wheel suspension, the invention is equally advantageous for the wheel suspensions of other vehicles such as trucks, buses and off-the-road vehicles, as well as railroad suspensions and in shock mountings of all sorts. It is not intended that the invention shall be limited to the particular type of air spring nor to the specific wheel suspension described. So long as an air spring is to be used in an environment where the performance of the air spring and the ease and cost of assembling it in the environment are significant factors, it will be advantageous to employ the present invention.

Now referring to the drawing, a typical wheel suspension for the wheel, not shown, of an automobile as shown in FIGURE 1 comprises a frame member 10 and a pivotal arm 11 which supports the wheel spindle, not shown. The wheel suspension so far as its attachment to the wheel and to the frame of the automobile is concerned need not be described in further detail.

When the wheel of the automobile encounters a bump in the road, it will move upward and outward, this movement being permitted by the pivoting of the arm 11 about its pivot point upwardly toward the frame 10. This movement of the wheel is cushioned by a single-convolution air spring, embodying the present invention, which is indicated generally at 15 and which is positioned between the frame member 10 and the arm 11.

The air spring 15 will usually contain air under operating pressures of about 50–100 pounds per square inch, but they may reach 150 pounds per square inch, and it is designed to take a neutral or design position as shown in the drawing. If the wheel encounters a pronounced bump on the road the air spring will become compressed and the lower bead 16 will be forced upwardly through the larger bead 17 to take a position such as that shown in dotted lines. As the air spring goes from the solid line position to the dotted line position, the changing effective area of the air spring and at the same time the changing air pressure within the air spring cooperate to provide a desirable spring rate.

Such an air spring 15 preferably comprises a body 18 of two plies, 19 and 20, of rubberized fabric, the fabric being essentially weftless and having cords which extend at an angle of about 15°–18° to the axis of the air spring with the cords of one ply crossing at an angle to the cords of the other. The interior of the bellows has an air-retaining lining 21 of rubber, preferably neoprene, because of its oil resistant properties. The ends of the plies 19 and 20 are wrapped about and anchored to a pair of circular bead rings 22 and 23 to form the beads 16 and 17, respectively.

Preferably, the top bead 17 has a shape in cross section which, as shown, is similar to the bead of a pneumatic tire. The bead 17 is positioned in place on a radial flange 24 of the reservoir structure 25 which in turn is secured to the frame member 10 of the automobile. The bead 17 is sufficiently flexible, the ring 23 being of 0.12 diameter, 1045 steel wire, to be deformed into oval shape so that it can be inserted at an angle through the flanged end 24 and then allowed to spring back into circular form where a slight downward pull will cause it to seat on flange 24 and effect an air-tight seal.

The bottom bead 16 is mounted so that it will move with the arm 11, and this is accomplished by having the small bead 16 snapped into compressive engagement with a supporting, tubular member 26 which is fixed to arm 11 in any suitable manner. The upper edge portion 27 of pedestal 26 is curved slightly inwardly, as shown, so that it can be snapped around the small bead 16 which is reentrantly curved to accept the edge 27 in the manner shown.

The inside diameter of the edge 27 is such that it can be snapped over the resilient bead 16, compressing the bead and forcing it out of the way as it passes over it, with the edge 27 coming to rest axially just beyond the bead ring 22. In this position the edge 27 exerts compressive forces upon the bead so that the air spring and pedestal tend to be locked together. To reinforce the bead portion 16 against such compressive forces, the bead is provided with an annular supporting member, preferably in the form of a flanged metal cup 32 whose sidewall 33 is vulcanized to the inner surface 34 of the bead and whose radial flange 35 is vulcanized to the end surface 36 of the bead. It will be observed that the sidewall of the cup strengthens the bead against the radial compressive forces exerted by the edge 27 while the flange of the cup strengthens the bead against the axial forces exerted by the edge. The cup 32 thus strengthens the bead against distortion and thereby insures a secure assembly of the parts.

Once the air spring and pedestal are assembled, the air spring will be retained in place not only by the compressive forces of assembly, but also by the inflation pressure within the air spring and by the normal forces of operation.

The cup 32 not only provides a convenient method of mounting the small bead 16 but it also operates to seal off the end of the air spring to retain air under operating pressures. Moreover, the flange 35 of the cup also supports a plate 37 which provides a rigid, smooth abutment for the operating lever 38 of a leveling valve (not shown) which is desirably located within the air spring for maximum protection against moisture, dirt, accidental injury and the like. When the air spring flexes in accordance with the movement of the wheel under static and dynamic loads, the lever 38 will sense the movement and operate the leveling valve accordingly to admit air to or vent it from the air spring.

The plate 37 is held in place by a resilient rubber lip 39 which snaps about the plate and urges it against the base 36 of the cup. The lip 39 is integrally molded to the bead portion of the air spring to define an annular groove 40 which receives the edge of the plate as shown. This construction facilitates assembly of the parts and offers without appreciable added cost the choice of locating the leveling valve within the air spring as preferred but elsewhere if necessary.

An alternative form of end construction is shown in FIGURE 2, where a reinforcing cup 50 is folded back upon itself to form a doubled flange 51 before it turns axially to form the sidewall 52, thereby supporting the beaded end of the air spring against the forces exerted thereon by member 31 which is similar in all respects to the pedestal member 26.

Various other modifications and changes will no doubt occur to those skilled in the art without departing from the scope of the invention, the features of which are summarized in the appended claim.

I claim:

An air spring comprising a reservoir component and a piston component with a flexible member therebetween, said piston component including a cup member and a tubular shaft portion, said reservoir component being designed to telescopically receive said piston component, said flexible member having a tapered lip sealingly engaging said reservoir component by force of the air pressure therein and including a bead ring sealingly bonded to said cup member about the outer surface thereof, the cup member and bead ring being seated in one end of said tubular shaft portion.

References Cited in the file of this patent

UNITED STATES PATENTS

| | | |
|---|---|---|
| 971,583 | Bell | Oct. 4, 1910 |
| 1,189,294 | Ruggles | July 4, 1916 |
| 2,578,730 | Nicholson et al. | Dec. 18, 1951 |
| 2,626,045 | Van Over et al. | Jan. 20, 1953 |
| 2,680,536 | Kojan | June 8, 1954 |
| 2,725,078 | Glaney | Nov. 29, 1955 |
| 2,848,956 | Deist | Aug. 26, 1958 |